United States Patent [19]

Woodling et al.

[11] 3,926,296
[45] Dec. 16, 1975

[54] PASSENGER CONVEYOR SYSTEM

[75] Inventors: Gerald L. Woodling, Akron; John H. Hewitt, Suffield; Ernest D. Johnson, Tallmadge, all of Ohio

[73] Assignee: Westmont Industries, Santa Fe Springs, Calif.

[22] Filed: Dec. 7, 1973

[21] Appl. No.: 422,675

[52] U.S. Cl.............................. 198/16 R; 198/115
[51] Int. Cl.² ........................................ B66B 9/12
[58] Field of Search..... 198/16 MS, 16 R, 115, 232, 198/203

[56] References Cited
UNITED STATES PATENTS

| | | | |
|---|---|---|---|
| 1,020,313 | 3/1912 | Scheuer | 198/115 |
| 1,711,576 | 5/1929 | Paterson | 198/203 |
| 1,728,283 | 9/1929 | Fisher | 198/232 |
| 1,764,791 | 6/1930 | Ingle | 198/203 |
| 2,880,852 | 4/1959 | Bergmann | 198/232 |
| 3,187,944 | 6/1965 | Stock | 198/208 X |
| 3,329,253 | 7/1967 | Tashman | 198/232 X |
| 3,419,127 | 12/1968 | Yost | 198/16 R |
| 3,653,484 | 4/1972 | Taylor | 198/16 R |
| R25,531 | 3/1964 | Fabula | 198/16 R |
| R27,439 | 7/1972 | Jackson et al. | 198/16 MS |

FOREIGN PATENTS OR APPLICATIONS 645,042   1/1964   Belgium .......................... 198/16 R Primary Examiner—Evon C. Blunk
Assistant Examiner—Richard K. Thomson
Attorney, Agent, or Firm—Frederick K. Lacher

[57] ABSTRACT

A passenger conveyor system in which the terminal ends of an endless conveyor are hinged for swinging movement of the ends upward. The major mechanical components which are located in pits at the ends of the conveyor are mounted on the underside of hinged structural members. The balustrades, landing plates and comb plates are mounted on the tops of the structural members. Clearance for lifting of the end assemblies is obtained by removing panels from the balustrades. In the up position of the terminal ends, the major mechanical components are lifted out of the pits and are accessible for service, repair, removal or replacement. The end assemblies are transportable into position for installation by using the pulleys mounted on the underside of the central structural members as supporting wheels. Mounting of the major mechanical components such as the driving pulley and belt take-up pulleys at the ends of the endless conveyor spaced from the comb plates makes possible improved control and driving of a belt conveyor without the necessity of a reverse bend in the belt path. The same drive is used for the handrail providing synchronization of the handrail and belt. An inclined handrail path at the ends provides an increased wraparound of the handrails over the driving pulley with a decreased wraparound at the balustrade newels.

17 Claims, 10 Drawing Figures

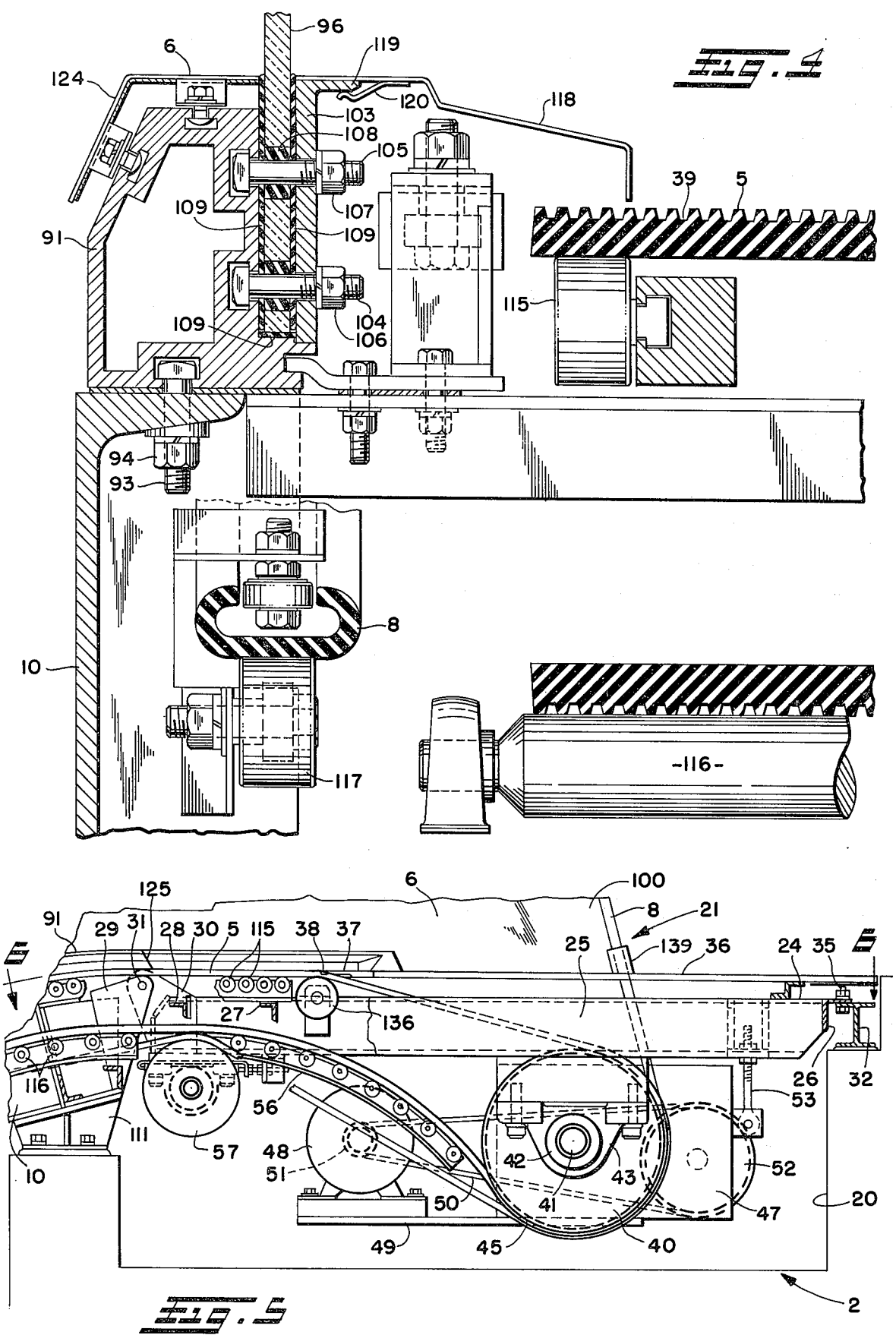

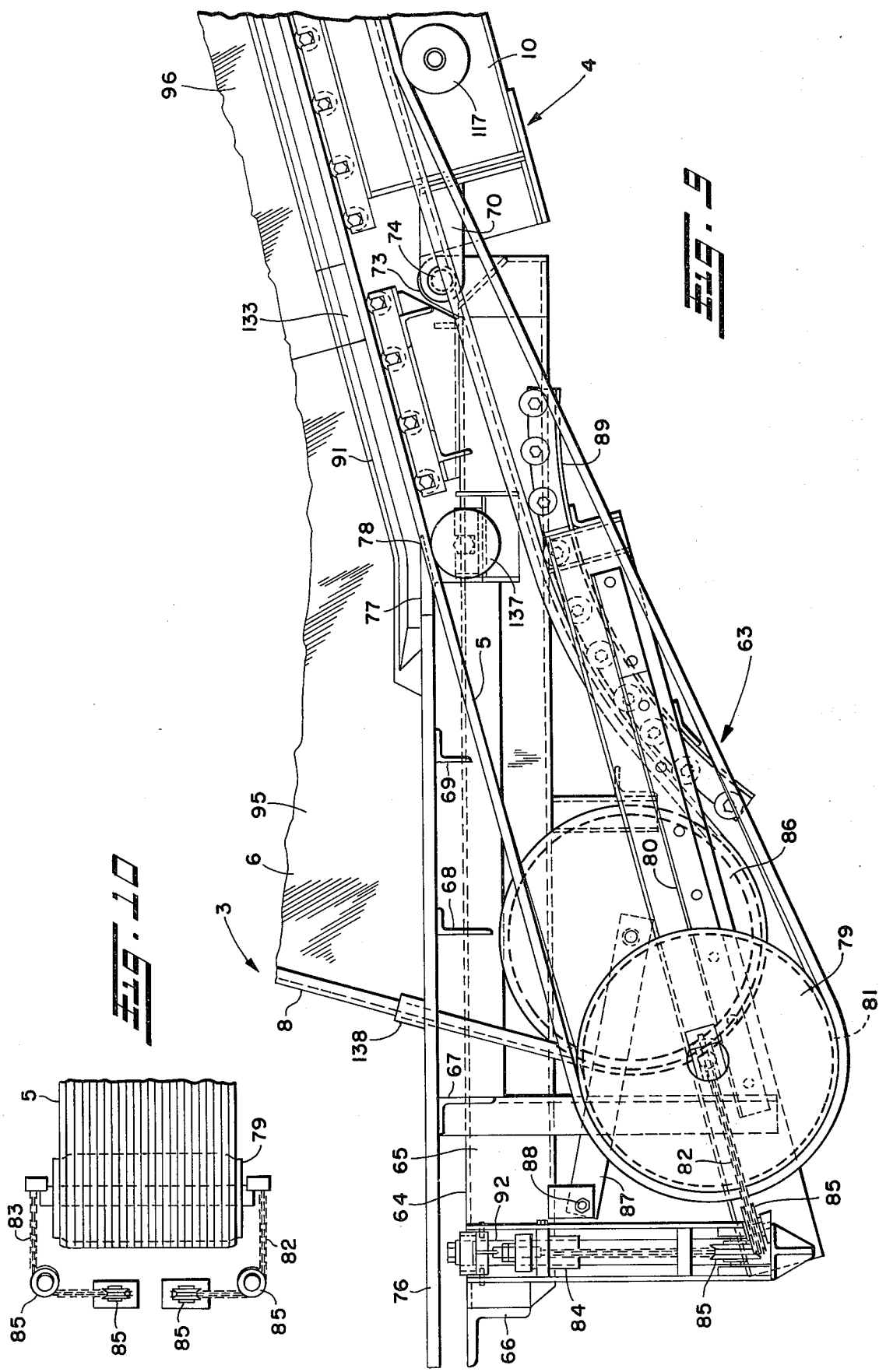

PASSENGER CONVEYOR SYSTEM

This invention relates generally as indicated to a conveyor construction in which the major mechanical components are located in pits at the ends of the conveyor and more especially to passenger conveyors where all the machinery is hidden in pits of limited size to meet the requirements for appearance and space.

It has been the practice to mount the major mechanical components on a basic frame in each of the pits at the ends of the conveyor. Subframing above the basic frame supported the landing plate, comb mechanism and balustrades. Normally the pits in which the frames and mechanism are located are only large enough to contain the equipment and only limited access between the balustrade and conveyor belt was provided for servicing. If a pulley bearing or other major component had to be replaced or repaired, this required disassembly of the terminal end construction from the top down with removal of the balustrade, landing plate and comb mechanism to reach the mechanism in the pits. This not only required substantial time but also necessitated the reassembly and realignment of the balustrade, landings and comb mechanism.

In conveyors where the major pulley surfaces have been flat to support the belt in contact with the comb plate, it has been necessary to provide mechanism to maintain the alignment of the belt. Also where the take-up pulleys are intermediate the ends of the conveyor, a full reverse bend of the belt and handrail has been necessary.

Driving of the handrail in synchronism with the belt has been a problem. Furthermore, the projecting balustrade newels have included a relatively sharp bend and a long wraparound of the handrail causing greater resistance to driving of the handrail. The space between the projecting balustrade ends and the floor has been wedge shaped which is undesirable at the exit end because of the danger to children getting caught between the handrail and belt.

The modern balustrade designs use glass panels with a minimum of base structure and practically no access space is left around the landing plates and conveyor belt.

In the manufacture and assembly of the conveyors used heretofore, the parts have been made at the factory and then shipped to the site for assembly in the pits. This has been more costly and undesirable than assembly at the factory.

With the foregoing in mind, it is the principal object of this invention to provide a terminal end assembly mounted on a supporting structure which is movable out of the pit at the ends of a conveyor.

Another object is to provide a supporting structure which is hinged for swinging movement of the supporting structure out of a pit.

A further object is to provide a central structural member for carrying the major mechanical components in an underslung relationship and supporting the balustrade and landing plate at the upper side.

A still further object is to provide for balustrades which have removable sections and discontinuous supporting members to permit swinging movement of the terminal ends out of the pits.

Another object is to provide for mounting pulleys at the underside of a central structural member in positions where they can be used as wheels for transporting the terminal end assembly.

A further object is to provide for mounting a driving pulley on the underside of the central structural member with the shaft of the driving pulley connected and supporting power means.

A still further object is to provide for mounting the take-up means for the handrails and endless conveyor under the central structural member.

Another object is to locate the major crowned belt pulleys at positions spaced from the comb plates.

A further object is to provide for the drive of the handrails and belt by a single driving pulley located at the end of the conveyor for improved wraparound of the pulley by the belt and handrail.

A still further object is to provide a balustrade newel with a reduced wraparound of the handrail over the newel and a straight end configuration.

These and other objects of the present invention may be achieved by a construction in which the terminal end assemblies are hinged so that upon removal of panels from the balustrade, the assemblies can be swung up and out of the pits for servicing of the major components mounted on the undersides of the central structural members.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the annexed drawings:

FIG. 4 is a sectional view taken along the plane of line 4—4 of FIG. 1, parts being broken away.

FIG. 5 is an enlarged fragmentary sectional view like FIG. 1 of the head end of the conveyor.

FIG. 9 is an enlarged side elevation of the tail end like FIG. 1 showing the take-up mechanism but in greater detail.

FIG. 10 is a fragmentary schematic plan view of the tail end illustrating the belt take-up cable pulley system.

Figure 1:
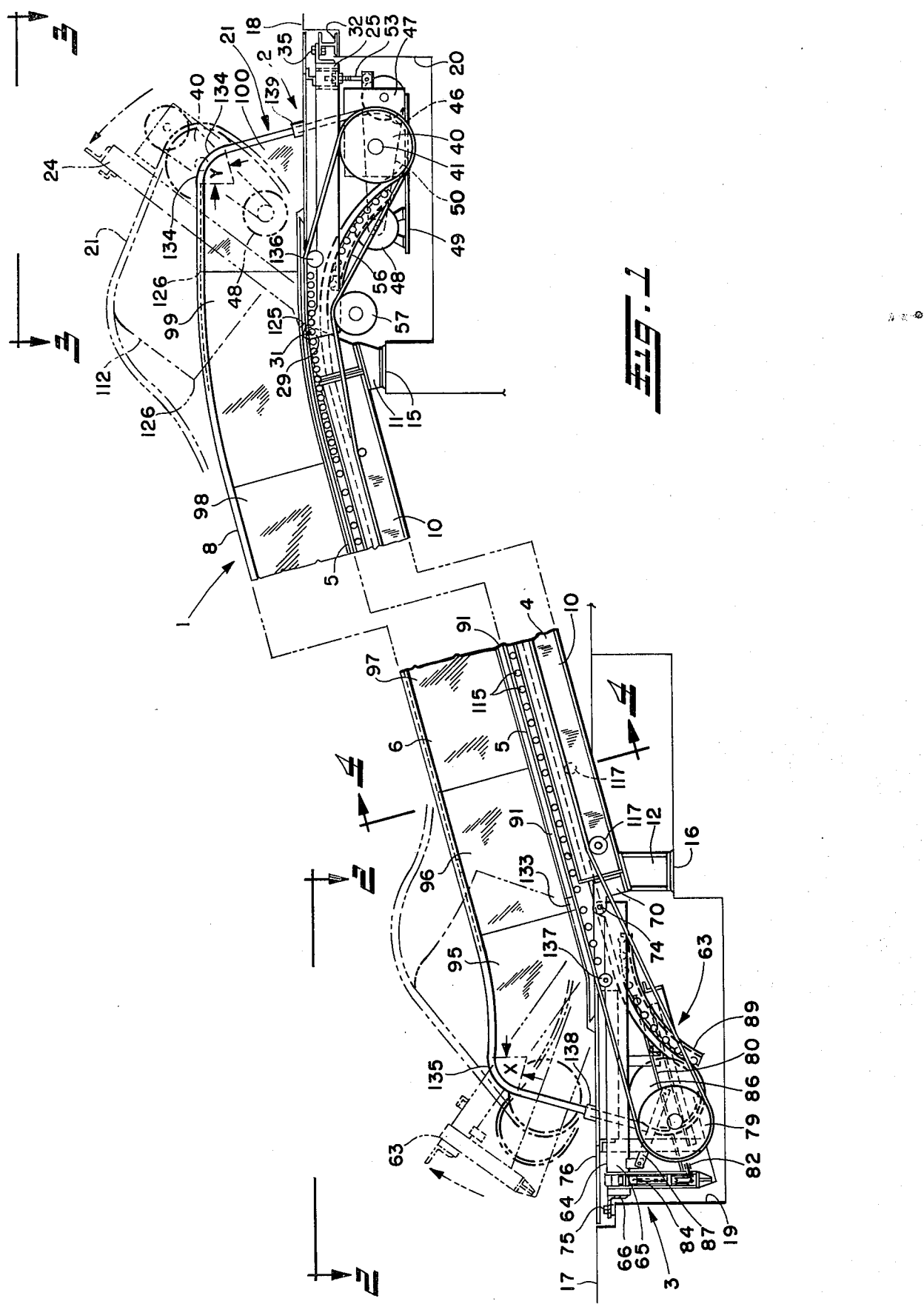
FIG. 1 is a schematic sectional side elevation of a passenger conveyor system including a preferred form of terminal end assemblies with parts being broken away and showing the end assemblies in the raised position in chain-dotted lines.

Referring to FIG. 1, an endless conveyor 1 for passengers is shown having an upper head end 2 and a lower tail end 3 connected by an intermediate inclined section 4. The conveyor 1 has a flexible belt 5 for carrying the passengers between the head end 2 and tail end 3. Balustrades 6 and 7 are provided at each side of the belt 5 and handrails 8 and 9 are slidably mounted on the balustrades 6 and 7, respectively.

The inclined section 4 is supported by an intermediate structure having side beams 10. Only one side beam 10 is shown; however, the other beam is of the same construction and located on the other side of the conveyor 1. The side beams 10 are supported at each end by an upper load bearing beam 11 and a lower load bearing beam 12 mounted on suitable supporting surfaces such as building supports 15 and 16 which may be on different floors of the building. The lower floor 17 is at the tail end 3 of the conveyor 1 and the upper floor 18 is at the head end 2 of the conveyor. Downwardly extending openings such as pits 19 and 20 are located in the lower floor 17 and upper floor 18, respectively, providing space in which the conveyor mechanism can be enclosed.

Figure 3:
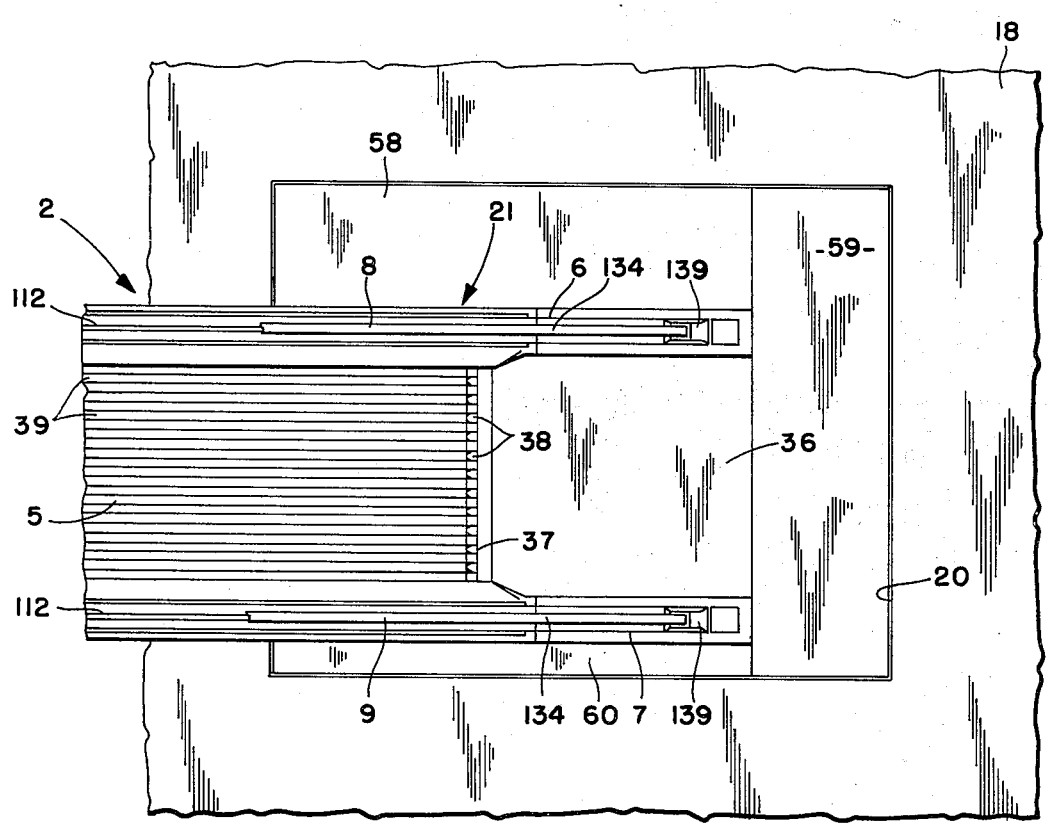
FIG. 3 is a fragmentary plan view of the head end of the conveyor taken along the plane of line 3—3 of FIG. 1, parts being broken away.
Figure 6:
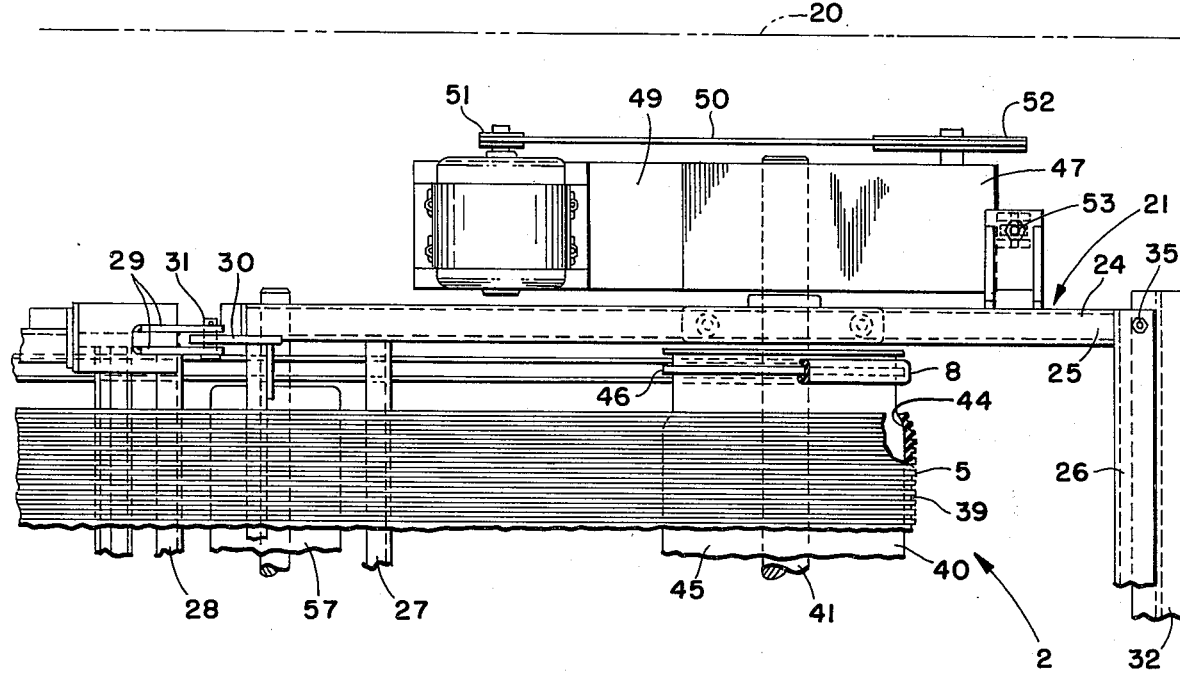
FIG. 6 is a fragmentary plan view of the head end taken along the plane of line 6—6 of FIG. 5 with parts being broken away.

As shown more clearly in FIGS. 3, 5 and 6, an upper terminal end assembly 21 is located at the head end 2 of the conveyor 1. The upper terminal end assembly 21 includes a central structural member or frame 24 having side beams 25 connected by transverse members 26, 27 and 28. A pair of spaced-apart structural plates are mounted on the upper end of each of the side beams 10 of the inclined section 4 providing yokes 29 for insertion of gusset plates 30 mounted on the ends of the side beams 25. Hinge pins 31 extend through aligned holes in the yokes 29 and gusset plates 30 providing a hinged connection between the side beams 10 and frame 24 at the side of the pit 20. The transverse member 26 is fastened to the opposite ends of the side beams 25 and is supported on an I-beam 32 at the opposite side of the pit 20 from the hinged connection. The transverse member 26 may be fastened to the I-beam 32 by suitable fasteners such as hold-down bolts 35.

A landing platform 36 is fastened to the top of the frame 24 and carries a comb plate 37 having teeth 38 in meshing engagement with grooves 39 in the surface of the belt 5. The upper ends of the balustrades 6 and 7 are also mounted on the frame 24 in supported relationship.

The endless conveyor 1 has major end components at the head end 2 including the power means underslung on the frame 24. The power means includes a driving pulley 40 mounted on a shaft 41 which is rotatably supported in bearings 42 contained in pillow blocks 43 fastened to the side beams 25. The driving pulley 40 has a cylindrical driving surface 45 with crowned edges 44 for engagement with the underside of the belt 5 at a position spaced from the comb plate 37. The driving pulley 40 also has annular ribs 46 at each end for driving engagement with the handrails 8 and 9.

As shown in FIG. 6, the shaft 41 extends outwardly from the frame 24 at one side into a gear box 47 on which a drive motor 48 is mounted through a supporting plate 49. A drive belt 50 extends around pulleys 51 and 52 of the drive motor 48 and gear box 47, respectively, for conveying power from the motor to the gear box. The gear box 47 and motor 48 which are supported on the extension of the shaft 41 are prevented from turning by a reaction connection or rod 53 extending between the gear box 47 and side beam 25, as shown in FIGS. 5 and 6.

In addition to the drive motor 48 and pulley 40 fastened to the underside of the frame 24, other end components such as a belt guide roller assembly 56 and handrail guide pulleys 57 are mounted on the underside of the frame 24.

The portion of the pit 20 not covered by the belt 5, landing platform 36 and balustrades 6 and 7 is covered by floor plates 58, 59 and 60 extending between the edges of the pit and the frame 24.

Figure 2:
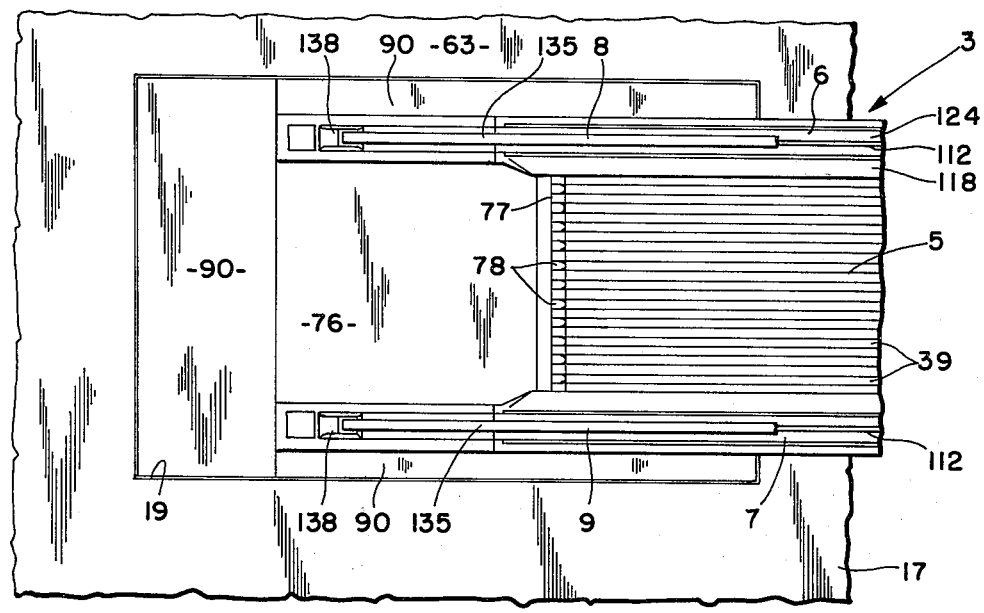
FIG. 2 is a fragmentary plan view of the tail end of the conveyor taken along the plane of lines 2—2 of FIG. 1, parts being broken away.
Figure 8:
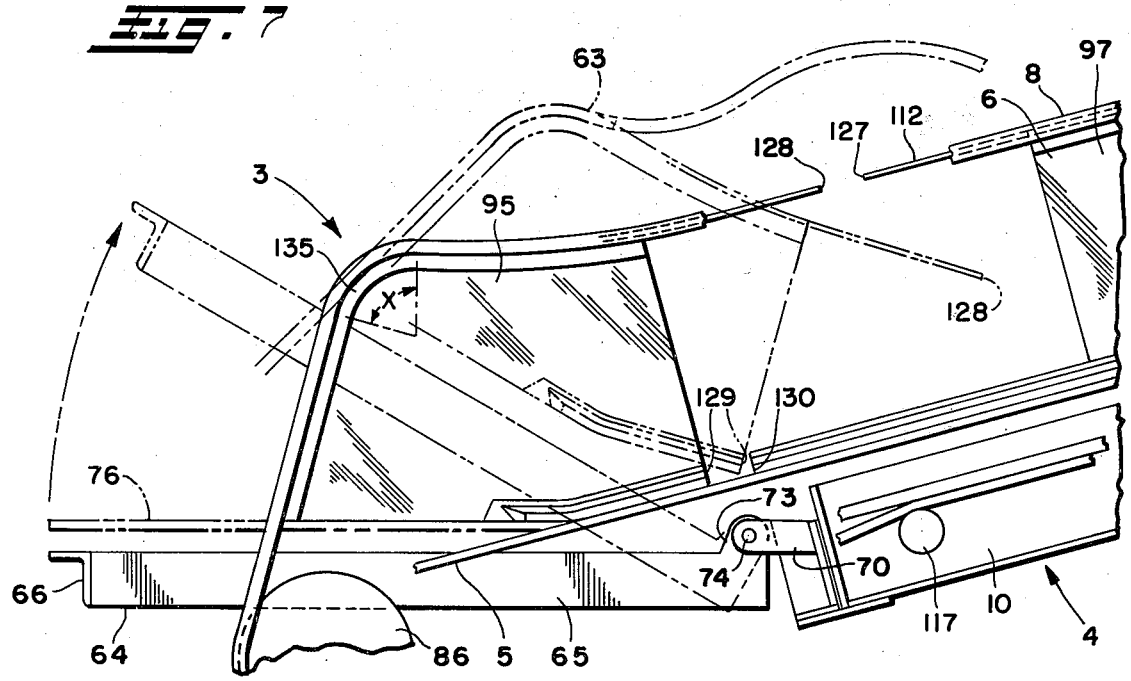
FIG. 8 is an enlarged view of the tail end shown in FIG. 1 illustrating the parts in more detail and with parts being broken away.

A lower terminal end assembly 63 is located at the tail end 3 and is shown more clearly in FIGS. 2, 8 and 10. A frame 64 has a construction like that of frame 24 for the upper terminal end assembly 21 and includes side beams 65 connected by transverse members 66, 67, 68 and 69. At the lower ends of the side beams 10, parallel plates are mounted in spaced-apart positions forming yokes 70 between which are interposed gusset plates 73 mounted on the ends of side beams 65. Hinge pins 74 extend through aligned holes in the gusset plates 73 and yokes 70 providing a hinged connection. At the opposite ends of the side beams 65 from the hinged connection, the transverse member 66 extends outwardly for supporting engagement with the side of the pit 19 and is held in place by hold-down bolts 75. A landing platform 76 is mounted on top the frame 64 and may carry a comb plate 77 having teeth 78 in meshing engagement with the grooves 39 of the belt 5.

The major end components underslung on the frame 64 include a belt take-up pulley 79 mounted on a track 80 for sliding movement longitudinally of the conveyor 1. The belt take-up pulley 79 may also have crowned edges 81. The ends of the pulley 79 are connected by chains 82 and 83 to a screw 84 which can be turned and locked in place by a drive lock to regulate the tension in the belt 5. As shown in FIGS. 9 and 10 sheaves 85 direct the chains 82 and 83 from the belt take-up pulley 79 to the screw 84. The screw 84 may be connected to a tension sensing switch mechanism 92 fastened to the transverse member 66 so that when the tension in the belt 5 decreases below a predetermined amount the power will be turned off stopping the conveyor.

At each side of the belt take-up pulley 79 are located two handrail take-up disks 86 about which the handrails 8 and 9 extend. Each of the handrail take-up disks 86 is pivotally mounted below one of the side beams 65 on an arm 87 connected to one of the side beams 65 by brackets 88 so that the weight of the arms and the take-up disks exert a force on the handrails 8 and 9 and provide the desired tension. Handrail guide roller assemblies 89 are also mounted under each side of the frame and guide the handrails into the intermediate inclined section 4 for movement between the head end 2 and tail end 3 of the conveyor 1.

At the top of the frame 64, the balustrades 6 and 7 are mounted on the frame, as shown in FIG. 9. Floor plates 90 extending between the frame 64 and the sides of the pit 19 completely cover the opening above the pit not covered by the landing platform 76 and balustrades 6 and 7.

Figure 7:
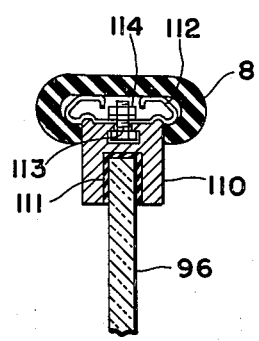
FIG. 7 is an enlarged fragmentary sectional view of the handrail and handrail guide illustrating the attachment to the upper edge of the balustrade for which the lower edge is shown in FIG. 4.

With reference to FIGS. 4 and 7, a more detailed view of the balustrade 6 is shown. The following description also pertains to the other balustrade 7 which is identical except that it faces in the opposite direction. The balustrade 6 has a base member 91 extending longitudinally along the sides of the conveyor 1 which is fastened to the side beam 10 of the inclined section 4, as shown in FIG. 4, or may be fastened to the frame 24 of the upper terminal end assembly or the frame 64 of the lower terminal end assembly. Suitable fasteners such as bolts 93 and nuts 94 may be used to fasten the base member 91 to the beam 10. Extending upwardly from the base 91 are transparent panels 95, 96, 97, 98, 99 and 100 which may be of tempered glass or of other high strength material. These panels are held in position by clamping plates 103 held in position by bolts 104 and 105 and nuts 106 and 107 threaded on the bolts. Cushioning material such as rubber washers 108 and gaskets 109 may be interposed between the base member 91, clamping plates 103, bolts 104 and 105, and the transparent panels 95 through 100, as shown in FIG. 4.

At the top edge of the panels 95 through 100, a channel 110 having the same length as each of the transparent panels 95 through 100 is mounted on the top edge of the panels and, as shown in FIG. 7, the channel is secured as by a gasket 111 adhered to the channel 110 and to the panel 96. A handrail guide rail 112 is fastened to the top of the channel 110 as by bolts 113 and nuts 114. The handrail 8 may then be snapped over the guide rail 112 for sliding movement along the conveyor 1.

With reference to FIG. 4, other stuctural members are shown including the supporting edge rollers 115 for the upper run of the belt 5 and the supporting full-length rollers 116 for the lower run of the belt. Return rollers 117 are also shown for the handrail 8.

The balustrade 6 has a toe trim member 118 extending from the clamping plates 103 over the edges of the belt 5, as shown in FIG. 4. This toe trim member 118 may be clamped over an edge 119 of the clamping plate 103 by spring clips 120. Outer trim plates 124 may also be fastened to the base member 91 by suitable fasteners.

As shown in FIGS. 1 and 8, the upper terminal end assembly 21 and lower terminal end assembly 63 are movable from the positions shown in solid lines to the positions shown in chain-dotted lines. In order to swing the upper terminal end assembly 21 to the position shown in chain-dotted lines in FIG. 1, the transparent panels 99 are removed by unscrewing the nuts 106 and 107 from the bolts 104 and 105 permitting removal of the clamping plates 103 and toe trim plates 118 at each side of the conveyor 1. At the top of the panels 99, the handrails 8 and 9 are pulled off the guide rails 112 and the nuts 114 removed from the bolts 113 whereupon the panels 99 on both sides of the conveyor can be removed.

As shown in FIGS. 1 and 5, the base member 91, trim plates 118 and 124 have joints at plane 125 permitting swinging movement of the portions of the base members 91 over the pit 20 while the remainder of the base members remain stationary. In the same manner, the handrail guide rails 112 have joints at the plane of line 126 so that upon swinging movement of the upper terminal assembly 21, a portion of the guide rails 112 adjacent the pit 20 will swing upwards while the remainder will stay stationary.

Before lifting the frame 24 with a suitable hoist such as an A-frame, the hold-down bolts 35 are removed and the floor plates 58, 59 and 60 are removed. The complete upper terminal end assembly 21 may then be hoisted to the position shown in chain-dotted lines in FIG. 1 and as can be seen, the mechanism underslung on the frame 24 including the drive motor 48, driving pulley 40 and the gear box 47 are in a position where they can be serviced, replaced or moved without necessitating the disassembly of the balustrades 6 and 7 or the realignment of the belt 5, handrails 8 and 9 and comb 37 as has been required in the past.

When the servicing has been completed, the upper terminal end assembly 21 may be lowered to the position shown in solid lines, the floor plates 58, 59 and 60 installed, and the panels 99 replaced by fastening those fasteners which were removed during the preparation for swinging the assembly into the up position. After forcing the handrails 8 and 9 over the guide rails 112 the conveyor 1 is ready to operate.

In a similar manner, the lower terminal end assembly 63 may be lifted from the position shown in solid lines in FIGS. 1 and 8 to the position shown in chain-dotted lines. The transparent panels 96 are removed by pulling off the handrails 8 and 9 exposing the nuts 114, in fastening the handrail guide rail 112 from the channel 110 so that these nuts may be removed and permitting the channel to be removed from the guide rail. The toe trim members 118 are then removed exposing the nuts 106 and 107 on bolts 104 and 105 bearing against the clamping plates 103. The nuts 106 and 107 are then removed along with the clamping plates 103 whereupon the transparent panels 96 can be removed as shown in FIG. 8.

In order to provide the necessary clearance for this swinging movement, the handrail guide rails 112 are discontinuous in this portion of the conveyor with gaps between the ends 127 and 128. The base members 91 are also discontinuous providing gaps between the ends 129 and 130. Between these ends 129 and 130 on each side of the conveyor, a short section or insert 133 of the base member 91 and trim plate 124 is provided, which can be removed for the necessary clearance in the gap and replaced to provide a continuous base member and trim plate at each side of the conveyor in the down position of the lower terminal end assembly 63.

In addition to removing the panels 96 and the inserts 133, the hold-down bolts 75 must be removed along with the floor plates 90. A suitable hoist such as an A-frame may then be used to raise the lower terminal end assembly 63 to the position shown in the chain-dotted lines for servicing of the belt take-up pulley 79 and handrail take-up disks 86 as well as the handrail guide roller assemblies 89. This of course can be done without disassembling the balustrades 6 and 7, landing platform 76 and other major components which would then have to be realigned before assembly. The lower terminal end assembly 63 can be lowered back into position in the pit 19 and the panels 96 replaced in a manner similar to that described hereinabove for the upper terminal end asssembly 21.

In the initial construction of the conveyor 1, the underslung components of the upper terminal end assembly 21 can be assembled at the factory and shipped to the site. These components would be the driving pulley 40 along with the gear box 47 and drive motor 48. The driving pulley 40 would have a protective material held by bands around the outer surface but extends downward below the drive motor 48 and supporting plate 49 so that the frame 24 with these underslung components can be moved, for instance, from an unloading dock to the site of the conveyor installation by rolling the assembly 21 on the driving pulley. The assembly 21 may then be rolled onto cribbing above the pit 20 and lowered into place by jacks eliminating the need to provide special loading equipment and installation operations. After the frame 24 is lowered into position, the hinge pins 31 can be inserted and the unit swung out of the pit 20 for further assembly with the other parts of the conveyor.

In a similar manner, the lower terminal assembly 63 with the belt take-up pulley 79 and the handrail take-up disks 86 can be assembled at the factory and transported to the installation site in the assembled condition. This assembly 63 can be rolled on the belt take-up pulley 79 and handrail take-up disks 86 in a similar manner as the upper terminal end assembly 21 is rolled on the driving pulley 40.

The balustrades 6 and 7 have newels 134 and 135 at the head and tail ends 2 and 3, respectively. Each of the balustrade newels 134 and 135 are located at positions over the landing platforms 36 and 76 so that passengers will be able to grasp the handrails 8 and 9 before stepping on the belt 5 and after stepping off the belt. The newels 134 and 135 are also located so that the handrail guide rails 112 slope towards the ends of the conveyor and the angles of wraparound X and Y of the handrails 8 and 9 over the newels 134 and 135 are minimized. This reduces the power necessary to drive the handrails 8 and 9 and also reduces wear caused by friction of the handrails sliding over the newels 134 and 135.

At the head end 2 the driving pulley 40 is the end pulley located beyond the newel 134 and spaced from the comb plate 77 providing a substantial wraparound by the belt 5 and handrails 8 and 9 on the driving pulley. The wraparound of the belt 5 is further increased by the guide roller assembly 56 engaging the lower return run of the belt as shown in FIG. 5. The wraparound of the handrails 8 and 9 is further increased by the handrail guide pulley 57 engaging the lower return run of the handrail. A comb plate pulley 136 is mounted on the side beams 25 adjacent the comb plate 37 to hold the grooves 39 of the belt 5 in meshing engagement with the teeth 38 of the comb plate.

At the tail end 3 the belt take-up pulley 79 is the end pulley located beyond and spaced from the comb plate 77 providing a substantial wraparound by the belt 5 on the take-up pulley. The wraparound of the belt 5 is further increased by the belt return rollers 117 mounted on the side beams 10 for engagement with the lower return run of the belt. The handrail take-up disks 86 are located beyond the newel 135 providing a substantial wraparound by the handrails 8 and 9. The handrail wraparound on the disks 86 is further increased by the handrail guide roller assemblies 89 engaging the lower return run of the handrail as shown in FIG. 9. A comb plate pulley 137 is mounted adjacent the comb plate 77 on the side beams 65 to hold the grooves 39 in the belt 5 in meshing engagement with the teeth 78 of comb plate.

Handrail guards 138 and 139 at the head end 2 and tail end 3, respectively, are mounted at the ends of the balustrades 6 and 7. The handrail guards 138 and 139 extend upwardly from the landing platforms 36 and 76 and are positioned so as to project ahead of the handrails 8 and 9 to protect passengers from contacting the handrails.

With the construction of the newels 134 and 135 and the positioning of the driving pulley 40, belt take-up pulley 79 and handrail take-up disks 86, the wraparound of the belt 5 is sufficient for the necessary driving friction and take-up without necessitating a full reverse bend in the belt 5. This is also true of the handrails 8 and 9 and makes possible a conveyor system in which the thickness or depth of the inclined section 4 can be kept at a minimum to meet space and appearance requirements.

The slope of the handrail guide rails 112 at the newels 134 and 135 includes no recesses or wedge-shaped spaces. This plus the sloping configuration provides a safe easily seen entry and exit to the conveyor system. The handrail guards 138 and 139 also contribute to the safe operation of the conveyor system.

From the foregoing, it is evident that the terminal end assemblies 21 and 63 may be swung or lifted out of the pits 19 and 20 at the ends of the conveyor 1 in other ways and the invention may be applied to other types of belt conveyors. While certain representative embodiments and details have been shown for the purpose of illustrating the invention, it will be apparent to those skilled in the art that various changes and modifications may be made therein without departiing from the spirit or scope of the invention.

We claim:

1. A terminal end assembly for an endless passenger conveyor having a pit with a bottom and sides comprisng an endless belt, a supporting structure hingedly connected at one side of said pit for swinging movement of said supporting structure about a horizontal axis, said supporting stucture including a central structural member extending in a generally horizontal position across said pit in the operating condition of said conveyor, end components of said assembly mounted on said central structural member with a least some of said components including a pulley for said belt mounted on the underside of said structural member and extending downwardly into said pit and balustrades mounted on the top side of said structural member at the edges of said belt, said balustrades having handrail guide members for endless handrails movable over said balustrades, said handrail guide members being discontinuous and said balustrades having removable sections to provide clearance for swinging movement of said supporting structure and all of said end components as a unit about said horizontal axis.

2. A terminal end assembly according to claim 1 wherein said removable sections comprise transparent panels with attached channels.

3. A terminal end assembly according to claim 1 wherein said end components include a landing platform mounted on the top of said central structural member.

4. A terminal end assembly according to claim 3 wherein said endless conveyor further comprises a longitudinally grooved belt and a comb member mounted on said landing platform having teeth in meshing engagement with the grooves of said belt.

5. A terminal end assembly according to claim 1 wherein said handrail guide members have gaps between said movable portions and said stationary portions to provide clearance for swinging movement of said supporting structure.

6. A terminal end assembly according to claim 1 wherein said end components include a driving pulley, and said belt and said handrails being engageable with said driving pulley.

7. A terminal end assembly according to claim 6 wherein said driving pulley has a shaft rotatably mounted on the underside of said central structural member and power means for rotating said driving pulley mounted on said shaft and connected to said supporting structure by reaction means.

8. A terminal end assembly according to claim 1 wherein said end components include handrail take-up means and belt take-up means mounted on the underside of said central structural member for regulating the tension in said handrails and said belt.

9. A terminal end assembly according to claim 8 wherein said handrail take-up means includes a handrail take-up pulley for each of said handrails supported on an arm pivotally mounted on said central structural member at a side opposite to the hinged side so that the weight of said handrail take-up pulley provides tension in said handrail in a direction to take up elongation of said handrail.

10. A terminal end assembly according to claim 9 wherein said end components further include a handrail guide roller assembly mounted on the underside of said central structural member and extending away from the hinged side for directing the lower return run of said handrail around said handrail take-up pulley and to a position close to the lower return run of the belt.

11. A terminal end assembly according to claim 1 wherein said end components include a belt take-up pulley slidably mounted on said supporting structure and tension applying means mounted on said structural member at a side opposite to the hinged side connected to said belt take-up pulley for applying a force on said pulley in a direction away from said hinged side to apply the desired tension to said belt and take up elongation of said belt.

12. A terminal end assembly according to claim 11 wherein said tension applying means includes an adjusting screw mounted on said structural member at the side opposite the hinged side and connected to said belt take-up pulley by chains extending from said screw towards the hinged side.

13. A terminal end assembly according to claim 1 wherein said balustrades further comprise transparent panels having supporting channels at the upper edges for attachment to said handrail guide members.

14. A terminal end assembly according to claim 13 wherein said balustrades further comprise base members connecting said transparent panels to said supporting structure.

15. A terminal end assembly according to claim 14 wherein said base members are discontinuous to provide for swinging movement of movable portions of said base members relative to stationary portions.

16. A terminal end assembly according to claim 15 wherein said base members have gaps between said movable portions and said stationary portions and removable base member inserts for positioning in said gaps.

17. A terminal end assembly accordng to claim 1 wherein said end components include at least one pulley mounted on the underside of said structural member and extending downwardly beyond any other of said components for rolling engagement with a supporting surface whereby said central structural member and said components may be transported along said supporting surface when disconnected from said horizontal axis.

* * * * *